Patented Sept. 6, 1927.

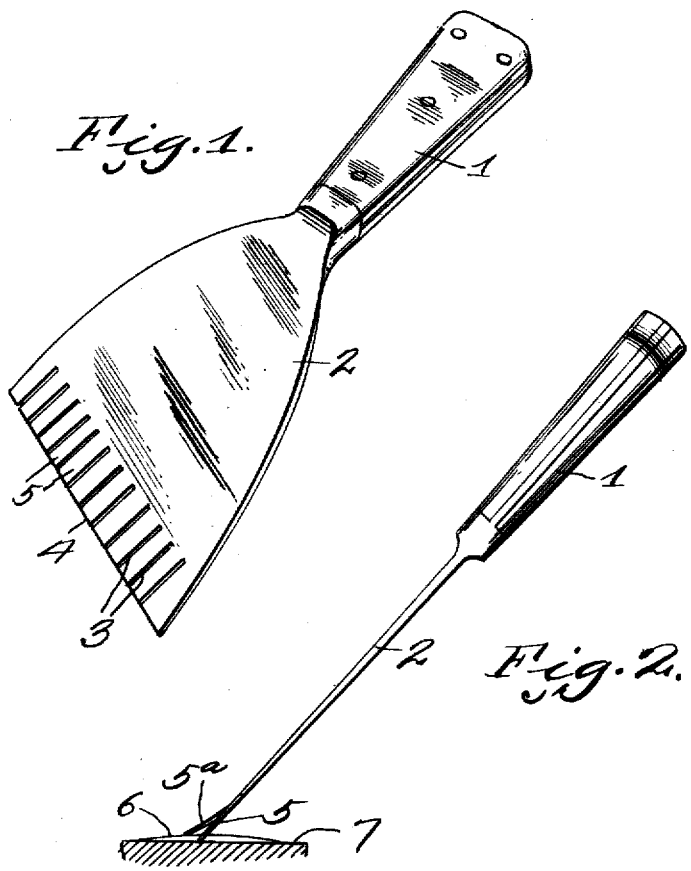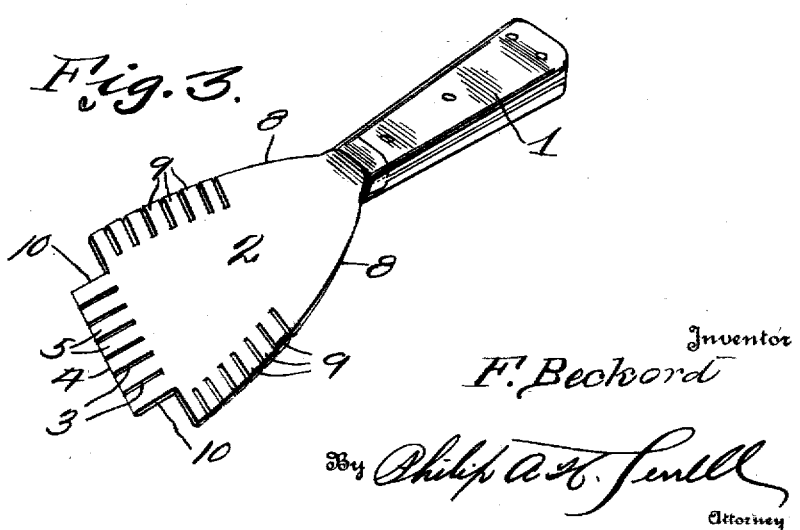

1,641,522

UNITED STATES PATENT OFFICE.

FREDERICK BECKORD, OF WHITE HOUSE, NEW JERSEY.

SCRAPER.

Application filed October 1, 1926. Serial No. 138,898.

The invention relates to scraping tools particularly adapted for use by painters and paper hangers for scraping paint or paper from surfaces, and has for its object to provide a device of this character comprising a blade having a scraping edge and which scraping edge is formed from a plurality of flexible members normally in the same plane. The plurality of flexible members forms means whereby when the scraping edge is moved over a surface the edge will conform to the irregularities of the surface, thereby insuring a positive scraping operation.

A further object is to provide a scraper comprising a flexible blade having a scraping edge and a plurality of slits in the blade extending inwardly from the cutting edge, thereby forming a plurality of flexible scraping members.

A further object is to provide the end and side of the blade with scraping members formed by slotting said scraping edge and blade side.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the scraper.

Figure 2 is a side elevation of the scraper.

Figure 3 is a perspective view of another form of scraper showing the sides thereof provided with flexible scraping members.

Referring to the drawing the numeral 1 designates the handle of the tool, and 2 the blade, which blade may be of any size desired, however it is preferably formed from hard flexible metal. In scrapers as at present provided for general scraping purposes, for instance wall paper scrapers or paint scrapers, the scraping edge will not conform to irregularities in the surface that is scraped, therefore the scraping operation is slow and laborious. To obviate the above difficulty the blade 2 is provided with a plurality of inwardly extending slits 3 extending inwardly from its cutting edge 4 thereby forming a plurality of flexible independent scraping members 5, which scraping members will flex according to the surface over which the tool is forced, consequently concave and convex portions of the surface will be thoroughly scraped, which is not true where a single straight edge is used, therefore it will be seen that the flexible scraping members 5 cooperate with each other whereby as the tool is forced over a surface, the entire surface will be scraped. The length of the members 5 may vary as desired according to the nature of the work, and the size of said members may also vary according to the nature of the work and the amount of flexibility desired.

Referring to Figure 2 it will be noted that the member 5ª is flexed forwardly while going over the convexed surface 6, while the adjacent members 5 are in scraping engagement with the surface 7, therefore it will be seen that a surface is thoroughly scraped.

Referring to Figure 3 wherein another form of the device is shown, it will be noted in this figure that the opposite sides 8 of the blade 2 are provided with flexible scraping members 9 of similar construction as the flexible members 5, and said sides may be used for scraping purposes when desired. It is understood that the flexible members 9 may be placed on either or both sides of the blades, however the corners of the blade 2 are preferably recessed as shown at 10, to prevent forming of weak corners which would be the case incident to the slotting of the flexible blade if they were not eliminated.

From the above it will be seen that a scraping tool is provided, which may be used for general scraping purposes, however it is particularly adapted for use by paper hangers, painters, automobile workers or cleaners and scraping rust from metal surfaces. It will also be seen that the tool will conform to the curvature of the surface over which it moves and the same may be cheaply manufactured and sold.

The invention having been set forth what is claimed as new and useful is:—

1. A scraper comprising a blade having a scraping edge, said scraping edge being formed from a plurality of flexible scraping members having scraping edges in alinement.

2. A scraping tool comprising a flexible blade, a plurality of integral flexible members formed by slotting the edge of the blade inwardly, said flexible members having scraper edges in alinement.

3. A scraping tool comprising a handle member, a flexible blade, a plurality of flexible scraping members carried by said blade and having scraping edges.

4. A scraper comprising a handle member, a flexible blade carried by said handle member and having inwardly extending end and side slots thereby forming a plurality of flexible scraping members at the side and end of the blade.

5. A scraper comprising a flexible blade, a plurality of spaced flexible scraper members at the end of the blade, a plurality of spaced flexible members at the sides of the blade and starting from adjacent the inner ends of the end flexible members.

In testimony whereof I hereunto affix my signature.

FREDERICK BECKORD.